United States Patent
Justus et al.

(10) Patent No.: US 10,247,848 B2
(45) Date of Patent: Apr. 2, 2019

(54) ³HELIUM GAS PROPORTIONAL COUNTER

(71) Applicant: The United States of America, as represented by the Secretary of the Navy, Washington, DC (US)

(72) Inventors: Brian L. Justus, Springfield, VA (US); Alan L. Huston, Aldie, VA (US); Alan L. Justus, Los Alamos, NM (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/722,883

(22) Filed: Oct. 2, 2017

(65) Prior Publication Data
US 2018/0045848 A1   Feb. 15, 2018

Related U.S. Application Data

(63) Continuation of application No. 14/991,462, filed on Jan. 8, 2016, now Pat. No. 9,778,392.

(60) Provisional application No. 62/106,638, filed on Jan. 22, 2015.

(51) Int. Cl.
  *G01T 3/00*   (2006.01)
  *G01V 5/00*   (2006.01)

(52) U.S. Cl.
  CPC ............ *G01V 5/0091* (2013.01); *G01T 3/008* (2013.01)

(58) Field of Classification Search
  CPC .................................................. G01V 5/0091
  See application file for complete search history.

(56) References Cited

U.S. PATENT DOCUMENTS

| | | | |
|---|---|---|---|
| 2005/0205798 A1* | 9/2005 | Downing | G01T 1/167 250/390.11 |
| 2010/0019164 A1* | 1/2010 | Stephan | G01T 3/00 250/390.04 |

* cited by examiner

*Primary Examiner* — Edwin C Gunberg
(74) *Attorney, Agent, or Firm* — US Naval Research Laboratory; Stephen T. Hunnius

(57) ABSTRACT

A ³Helium gas counter comprising a container, a gas tube within the container, and a mixture of ³Helium and Xenon or a mixture of ³Helium and Krypton. A method of making a ³Helium gas counter comprising providing a container, placing a gas tube within the container, and depositing a mixture of ³Helium and Xenon or a mixture of ³Helium and Krypton into the gas tube.

13 Claims, 1 Drawing Sheet conventional ³He gas counter(s)
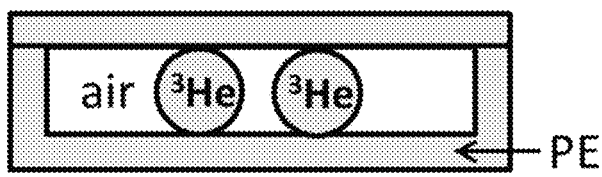
undermoderated
³He at 0.25 mg/cm³ exhibits signal losses due to wall effect.
proposed ³He/Xe gas counter
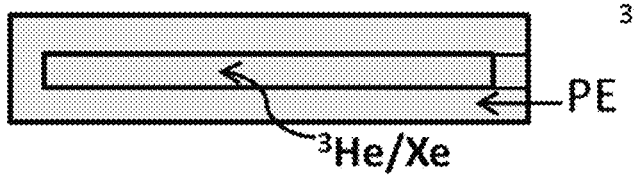
fully moderated
³He/Xe mixture at 11 mg/cm³ in rectangular tube.

$^3$HELIUM GAS PROPORTIONAL COUNTER

This application claims priority to and the benefits of U.S. patent application Ser. No. 14/991,462 filed on Jan. 8, 2016 and U.S. Patent Application No. 62/106,638 filed on Jan. 22, 2015, the entirety of each is herein incorporated by reference.

BACKGROUND

The present invention describes improvements in the design and manufacture of large-area, $^3$Helium gas proportional counters.

Large-area, $^3$He gas proportional counters are critically important tools for detecting and monitoring the movement of special nuclear materials. While the demand for $^3$He gas counters continues to increase, the availability of the most critical component, $^3$He, is diminishing.

The disclosed engineering innovations and improvements to the design of existing $^3$Helium gas counters will significantly reduce the quantity of $^3$He used in the counters, and the innovations will improve the efficiency and reduce the cost of the counters. The design innovations can be modeled computationally to determine optimal configurations, and the invention can reach beyond the embodiments described herein.

The innovations of this invention will have a significant impact on verification capabilities by enabling the manufacture of more large-area neutron detectors at lower cost per detector. This invention can immediately reduce the rate of consumption of $^3$He gas by implementing innovative changes in the fundamental design of existing, conventional $^3$He gas proportional counters. The invention will alleviate the immediate crisis caused by the shortage of $^3$He gas.

The development of efficient and cost-effective neutron detectors is a critical need for non-proliferation verification applications, including the detection of special nuclear materials and efforts to monitor their movement. The most common reactions used for thermal neutron detection are $^3$He(n,p), $^6$Li(n,$\alpha$) and $^{10}$B(n, $\alpha$), however, for large area detection applications, as in, for example, radiation portal monitors, $^3$He gas proportional counters are the most widely used detectors.

$^3$He gas counters are attractive because the neutron capture cross section of $^3$He, 5330 barns, is significantly higher than that of $^6$Li or $^{10}$B. In addition, $^3$He is an inert gas, and gas proportional counters manufactured using $^3$He do not represent a health hazard. In contrast, boron trifluoride, enriched to 96% $^{10}$B, is also widely used in gas proportional counters, however the BF$_3$ gas is highly toxic.

The $^3$He gas proportional counter is considered the "gold standard" for thermal neutron detection.

The demand for large-area $^3$He gas proportional counters has increased significantly in recent years in view of the potential threat raised by terrorists acquiring and transporting nuclear materials for use in acts of terror. However, the supply of $^3$He is not adequate to meet this demand, and the current annual production rate cannot be increased to meet the demand, so it is widely recognized that there is a critical shortage of $^3$He that will only get worse if the annual rate of consumption is not reduced significantly.

In response to the $^3$He shortage, many research groups have initiated basic research projects with the objective of developing new neutron detection technologies based primarily on $^6$Li or $^{10}$B, that match, or even exceed, the efficiency of $^3$He gas proportional counters. Unfortunately, the time to technical maturity of even the most impressively successful basic research program is on the order of 5 to 10 years. The immediate need for reducing the demand for $^3$He will not be satisfied by the development of new technologies that will not be ready for commercialization for the next 5 to 10 years.

SUMMARY OF THE INVENTION

One object of this invention to teach an improved $^3$Helium gas proportional counter system.

Another object of this invention is to teach an improved $^3$He gas proportional counter that collects the reaction product energy more efficiently than conventional $^3$He counters, in particular by reducing the reaction product energy losses to the tube walls.

Another object of this invention is to teach an improved $^3$He gas proportional counter that uses a gas mixture with a higher overall gas density, but the mixture has a lower $^3$He pressure, and the system uses less $^3$He than conventional $^3$He counters.

Another object of this invention is to teach an improved $^3$He gas proportional counter system that provides more uniform neutron capture and generation of reaction products throughout the entire volume of the gas tube, resulting in a reduced probability of neutron capture near the tube walls compared to conventional $^3$He counters.

Another object of this invention is to teach an improved $^3$He gas proportional counter system having a gas tube with a rectangular cross section that has a lower fractional volume of the gas mixture that is near to the wall, thereby reducing wall effects compared to conventional cylindrical gas tubes.

Another object of this invention is to teach an improved $^3$He gas proportional counter system having a gas tube with a rectangular cross section that will geometrically intercept all thermal neutrons crossing the gap between front and rear moderator faces.

Another object of this invention is to teach an improved $^3$He gas proportional counter system that is better moderated so as to absorb fast neutrons with greater efficiency than conventional $^3$He counters.

BRIEF DESCRIPTION OF THE DRAWINGS

FIG. 1 is a schematic illustrating the cross-sections of a conventional, low-intercepting, undermoderated $^3$He gas counter system that uses cylindrical tubes; and an exemplary, high-intercepting, well-moderated $^3$He/Xe gas counter system with a significantly improved detector efficiency.

DETAILED DESCRIPTION

FIG. 1 illustrates some of the main differences between the operation of conventional $^3$He gas counters and the $^3$He gas counter of this invention.

Conventional $^3$He gas counter systems are under-efficient and permanently undermoderated. The geometry of the polyethylene moderator and gas tube are not optimally matched, such that the interaction of fast neutrons with the detector system is often minimal and the detection of subsequent thermalized neutrons is not optimized.

The invention provides for replacement of the cylindrical tubes with a single gas tube with a rectangular cross section. The rectangular cross-section will eliminate the air gaps in the moderator that surrounds the gas tube because the polyethylene slabs will readily mate to the faces of the rectangular gas tube. The improvement in the moderation will reduce losses of diffusing thermalized neutrons and improve the detector efficiency. In addition, the total energy response can be readily tailored to potential targets.

Conventional $^3$He gas counters require operation at relatively high $^3$He pressures, up to 4 atmospheres, in order to achieve an overall gas density that is high enough to ensure efficient collection of reaction products within the gas volume. In large volume detectors, the use of high $^3$He pressure means that large quantities of $^3$He, a gas that is becoming increasingly scarce and expensive, are needed for each detector.

This invention provides for the use of significantly lower $^3$He pressures.

In order to ensure efficient collection of reaction products, the reduction in the $^3$He pressure must be offset by introducing another gas, preferably a high density gas, such as xenon, that ensures a high overall gas density. In fact, the use of a high density gas mixture can significantly improve the efficiency of the detector because it is possible to independently adjust the pressures of the component gases to optimize the efficiency of the detector. The pressure of the high density inert gas can be independently adjusted to optimize the overall gas density in the tube to permit efficient collection of reaction products and reduction of wall losses.

The pressure of the $^3$He can be independently adjusted to optimize neutron absorption throughout the gas tube.

Conventional $^3$He gas counters that operate at relatively high $^3$He gas pressure are not optimized for efficient neutron capture throughout the entire volume of gas in the tube. When the $^3$He pressure is set such that the density of the $^3$He is high enough to ensure efficient collection of reaction products, the pressure is much higher than what is needed for optimal neutron absorption. This increases the probability that neutron capture will occur near the tube wall. Neutron capture near the tube wall leads to an increased probability of reaction product energy loss to the wall.

As explained above, this invention solves a long-standing problem.

This invention provides for the use of a gas mixture that permits the use of lower $^3$He gas pressures. The $^3$He pressure can be independently adjusted (lowered) to an optimal value that provides for more uniform neutron capture throughout the entire volume of the tube. Independent optimization of the pressure of the $^3$He and the xenon gases will provide the gas counter of this invention with significantly improved detector efficiency.

Conventional $^3$He gas counters use cylindrical gas tubes. However, the cylindrical geometry is not optimum with respect to minimization of the wall effect because the cylindrical geometry has a relatively large differential element of volume near the tube surface. This invention teaches the use of a gas tube with a rectangular geometry. The rectangular geometry reduces the differential gas volume near the tube wall compared to the cylindrical geometry.

The innovations in the design of $^3$He gas proportional counters taught in this disclosure will result in improved detector efficiency, reduced consumption of $^3$He, and reduced cost per detector. In view of current concerns about high demands for an increasingly scarce commodity, the innovations herein will have a significant impact on verification activities by enabling the manufacture of more large-area neutron gas counters at lower cost per counter.

Example 1—Prior Art

For example, a currently deployed counter system has a hollow cavity with rectangular dimensions of 36"×15"×2" and uses two tubes, each 2" diameter by 36" long with a combined volume of about 3.7 l. The gas pressure is 2 atm.

Example 2

A rectangular replacement counter of about the same volume would have dimensions of 15"×36"×1 cm. This tube will be in a cavity with no air gaps, and optimized polyethylene thickness. MCNP calculations show that a two-fold or greater reduction in the pressure of the $^3$He occurs.

In addition, the calculations show that a two-fold reduction in the area of the gas tube (7.5"×36") is achieved.

The engineering innovations taught in this invention will achieve an overall four-fold reduction in the consumption of $^3$He and still achieve improved detector efficiency.

Given that currently fielded portal monitors (e.g., the TSA VM-250AGN) use two counters per pillar and two pillars per system, the total cost savings could be over $20K-$30K for each portal monitor system, depending on the price of the $^3$He. If the cost of $^3$He continues to rise, the savings will be greater.

The specific design improvements taught in this invention, including such parameters as the size, shape, volume and pressure, can be varied for each detector application. State of the art computational tools, such as MCNP calculations, can be performed for each application.

Other high density inert gases, such as Kr, could be used in place of Xe.

Many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What we claim is:

1. An apparatus using a neutron reactive gas consisting of:
    a gas tube; and
    a neutron reactive gas comprising a mixture of $^3$Helium and Xenon or a mixture of $^3$Helium and Krypton; and
    a neutron wherein the neutron interacts with the neutron reactive gas;
    further comprising an anode and a cathode and wherein a voltage is applied across the anode and the cathode such that a neutron passing through the tube interacts with a $^3$Helium atom and produces a tritium (hydrogen-3) and a proton.

2. The apparatus of claim 1 wherein the $^3$Helium and Xenon or $^3$Helium and Krypton mixture is at a density of 11 mg/cm$^3$ in the gas tube.

3. The apparatus of claim 1 wherein the pressure of the $^3$Helium is lower than 2 atm.

4. The apparatus of claim 1 wherein the gas tube is situated within a container and wherein there no air gaps or other gaps between the gas tube and the container.

5. The apparatus of claim 1 wherein the $^3$Helium and Xenon or $^3$Helium and Krypton mixture is at a density of 3-14 mg/cm$^3$ in the gas tube.

6. The apparatus of claim 5 wherein the proton ionizes a first set of gas atoms and creates a first set of charges, which then ionizes a second set of gas atoms in an avalanche-like multiplication process and thereby produces a second set of charges and wherein the second set of charges are collected as measurable electrical pulses with amplitudes proportional to neutron energy and wherein the pulses are compiled to form a pulse-height energy spectrum and wherein the pulse-height spectrum is used to identify and quantify the neutron and the neutron energy.

7. A method of making an apparatus using a neutron reactive gas consisting of:
   providing a container;
   placing a gas tube within the container;
   depositing a neutron reactive gas comprising a mixture of $^3$Helium and Xenon or a mixture of $^3$Helium and Krypton into the gas tube;
   adding an anode and a cathode to the gas tube;
   applying a voltage across the anode and the cathode;
   interacting a neutron with the neutron reactive gas; and
   allowing a neutron to pass through the tube wherein the neutron interacts with a $^3$Helium atom and produces a tritium (hydrogen-3) and a proton.

8. The method of making the apparatus of claim 7 wherein the $^3$Helium and Xenon mixture is deposited in the gas tube resulting in a density of 3 to 14 mg/cm$^3$ in the gas tube.

9. The method of making the apparatus of claim 7 wherein the $^3$Helium pressure is between 0.5 and 3 atm.

10. The method of making the apparatus of claim 7 such that there are no air gaps or other gaps between the gas tube and the container.

11. The method of making the apparatus of claim 7 such that the gas tube is flush with the container and in continuous contact therewith.

12. The method of making the apparatus of claim 7 wherein the neutron passing through the tube interacts with a $^3$Helium atom produces a tritium (hydrogen-3) and a proton and
   wherein the proton ionizes a first set of gas atoms and creates a first set of charges, which then ionizes a second set of gas atoms in an avalanche-like multiplication process and thereby producing a second set of charges.

13. The method of making the apparatus of claim 12
   wherein the second set of charges are measurable electrical pulses with amplitudes proportional to neutron energy;
   wherein the pulses compile to form a pulse-height energy spectrum; and
   wherein the pulse-height spectrum identifies and quantifies the neutron and the neutron energy.

* * * * *